United States Patent
Millard

[11] Patent Number: 5,982,446
[45] Date of Patent: Nov. 9, 1999

[54] VIDEO MODULATOR ARRANGEMENT

[75] Inventor: Stuart J Millard, Bristol, United Kingdom

[73] Assignee: Mitel Semiconductor, United Kingdom

[21] Appl. No.: 08/730,375

[22] Filed: Oct. 15, 1996

[30] Foreign Application Priority Data

Oct. 18, 1995 [GB] United Kingdom ............ 9521345

[51] Int. Cl.⁶ .............. H04N 7/04; H04N 5/40; H03C 3/38; H03C 5/00

[52] U.S. Cl. .......... 348/484; 348/424; 348/388; 348/485; 348/574; 348/608; 348/723; 455/295; 455/102; 455/108; 455/110; 332/120; 332/135; 332/152

[58] Field of Search ................. 348/470, 484, 348/486, 724, 462, 482–485, 738, 723, 728; 332/151; 455/108

[56] References Cited

U.S. PATENT DOCUMENTS

| | | | |
|---|---|---|---|
| 4,123,774 | 10/1978 | Hjortzberg | 348/470 |
| 4,168,511 | 9/1979 | Chabanel | 348/707 |
| 4,268,854 | 5/1981 | Ozawa | 348/470 |
| 4,286,336 | 8/1981 | Sanford | 455/117 |
| 4,496,979 | 1/1985 | Yu et al. | 348/737 |
| 4,651,064 | 3/1987 | Parker et al. | 348/805 |
| 4,672,452 | 6/1987 | Corbel et al. | 348/608 |
| 4,701,797 | 10/1987 | Ferreira | 348/724 |
| 4,825,286 | 4/1989 | Graves | 348/484 |
| 4,959,827 | 9/1990 | Grotzinger et al. | 348/473 |
| 5,155,455 | 10/1992 | Cowley et al. | 332/120 |
| 5,241,538 | 8/1993 | Kanno et al. | 348/473 |
| 5,293,633 | 3/1994 | Robbins | 348/6 |
| 5,442,700 | 8/1995 | Snell et al. | 348/10 |

FOREIGN PATENT DOCUMENTS 2 273 216  6/1994  United Kingdom.

OTHER PUBLICATIONS

Richard C. Dorf, The Electrical Engineering Handbook, p. 686 (Jan. 1993).

Jacob Millman and Arvin Grabel, Microelectronics, p. 508 (2nd Ed. Jan. 1987).

*Primary Examiner*—John K. Peng
*Assistant Examiner*—D.C. Peter Chu
*Attorney, Agent, or Firm*—Kirchstein, et al.

[57] ABSTRACT

In a single-chip multistandard video modulator arrangement in which audio signals for transmission with video signals are first modulated onto a subcarrier and then combined with the video signals for modulation onto a VHF or UHF main carrier, the modulated subcarrier signals are passed through a high-pass filter before being combined with the video signals in order to reduce the amplitude of any audio frequency components, and the resulting variations in main carrier amplitude, which tend to produce "sound in vision" effects.

18 Claims, 2 Drawing Sheets

VIDEO MODULATOR ARRANGEMENT

BACKGROUND OF THE INVENTION

The present invention relates to video modulator arrangements by means of which audio-frequency and video signals may be modulated onto a high frequency carrier signal. In particular although not exclusively the invention is concerned with multi-standard video modulator arrangements.

Video modulator arrangements up-convert baseband signals, namely audio and video signals, to VHF or UHF carrier frequencies in the range from, say, 40 MHz to 900 MHz. International standards are set down for the modulation parameters in the various systems, PAL, NTSC and SECAM, but in general the audio-frequency signals are first modulated onto a subcarrier, and the modulated subcarrier frequency components are combined with the video signal components for modulation onto the VHF or UHF carrier signal.

In SECAM systems, where the audio signal subcarrier is amplitude modulated at up to 80% modulation depth, known forms of modulator arrangement have given rise to unwanted variations in main carrier amplitude, which produce an effect known as sound in vision.

SUMMARY OF THE INVENTION

According to a first aspect of the present invention, in a video modulator arrangement comprising a double balanced mixer in which audio frequency signals are amplitude modulated onto a subcarrier signal, a combining circuit arrangement in which output signals from said mixer are combined with video signals, and a modulator circuit in which signals from said combining circuit arrangement are modulated onto a high frequency carrier signal, there are provided high pass filter means connected between the output of the mixer and the combining circuit arrangement.

According to a second aspect of the present invention in a video modulator arrangement comprising a first modulator circuit in which audio frequency signals are modulated onto a subcarrier signal selectively as frequency modulation or amplitude modulation of said subcarrier signal, a combining circuit arrangement in which output signals from said first modulator circuit are combined with video signals, and a second modulator circuit in which the combined signals are modulated onto a high frequency carrier signal, there are provided high pass filter means connected between the output of said first modulator circuit and said combining circuit arrangement.

BRIEF DESCRIPTION OF THE DRAWINGS

A modulator arrangement in accordance with the invention will now be described by way of example with reference to the accompanying drawings, of which.

DETAILED DESCRIPTION OF THE PREFERRED EMBODIMENTS

Figure 1:
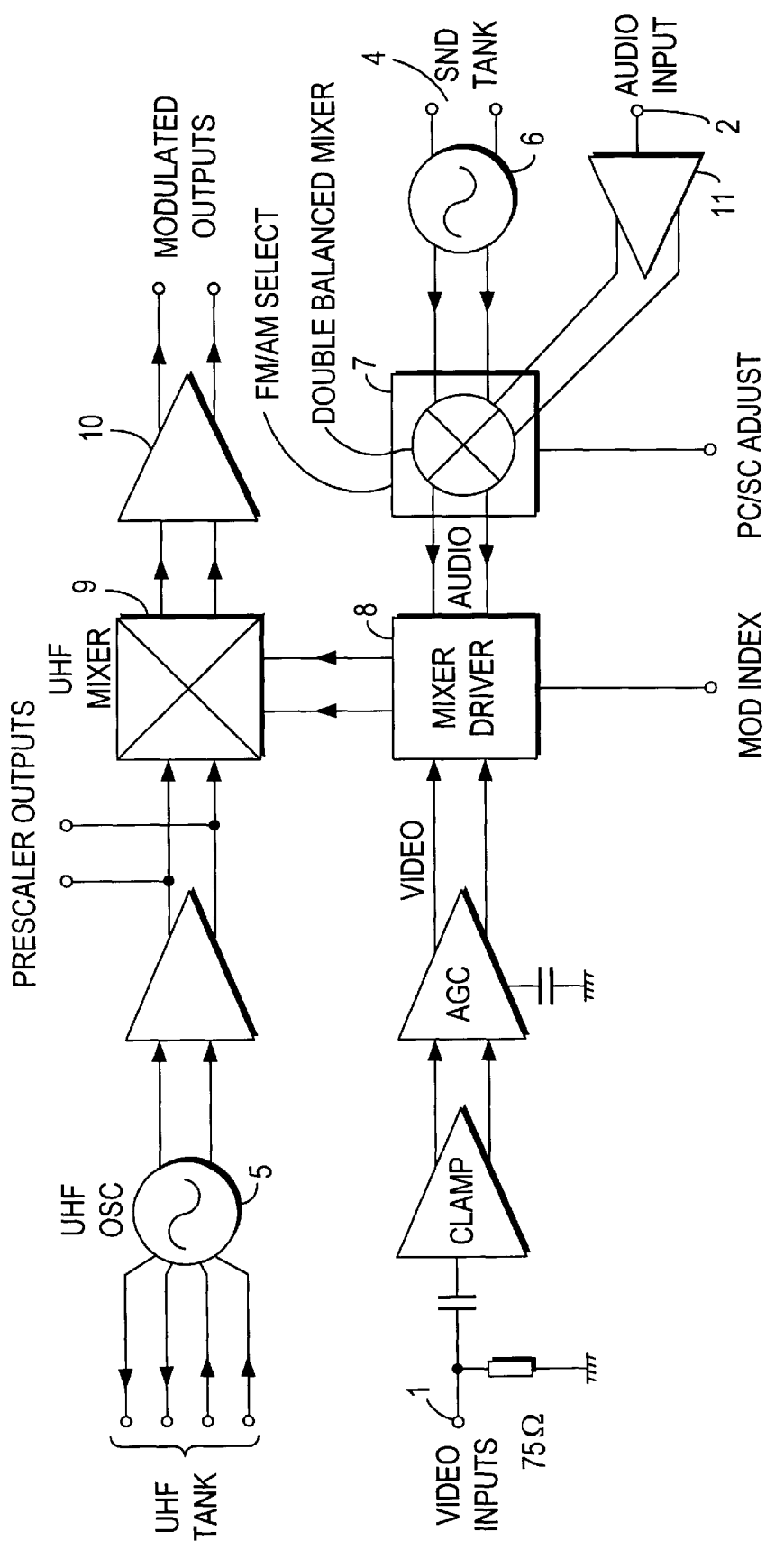
FIG. 1 shows schematically part of a known modulator arrangement, according to the prior art

Referring first to FIG. 1, a known multistandard modulator arrangement comprises a video up-converter, capable of operating at VHF and UHF carrier frequencies up to, say, 900 MHz, accepting base-band video and sound inputs at terminals 1 and 2 respectively. The modulator arrangement is formed on a single integrated circuit chip, with connections 3 and 4 for external frequency-determining tank circuits for a VHF/UHF carrier oscillator 5 and for a sound sub-carrier oscillator 6 respectively. The modulator arrangement is designed so that the sound sub-carrier modulator circuit 7 is capable selectively of frequency modulation or amplitude modulation, as described for example in British Patent No. 2,234,644 and the corresponding U.S. Pat. No. 5,155,455. For this purpose the circuit 7 includes a double-balanced mixer the output of which is either applied directly to a driver circuit 8, for applications where amplitude modulation is required, or is fed back to the circuit of the sub-carrier oscillator 6 as vector or reactance feedback to effect frequency modulation of the sub-carrier. In either case the modulated sub-carrier is combined in the circuit 8 with video signals, which may include chrominance sub-carrier signals, for application to a VHF/UHF mixer 9.

When a modulator arrangement of this form is utilized in a SECAM system, with its positive main-carrier modulation and amplitude modulation of the sound sub-carrier, at up to 80% modulation depth, sound in vision effects can occur, and these effects have been attributed to intermodulation arising from non-linearities in the driver circuit 8 or in the circuits following the mixer 9, represented in FIG. 1 by amplifier 10. Considerable effort has gone into reducing these non-linearities, but it has in general been found necessary when using the multistandard arrangement in SECAM systems to a.c. couple in a sound sub-carrier which has been modulated off-chip.

It has been found, however, that a slight imbalance in the outputs of a single-ended to differential amplifier 11 by which audio signals at the input 2 are applied to the modulator circuit 7 can occur, and this slight imbalance can contribute appreciably to the sound in vision, by giving rise to components at base-band, that is, at audio frequencies, at the output of the circuit 7.

Figure 2:
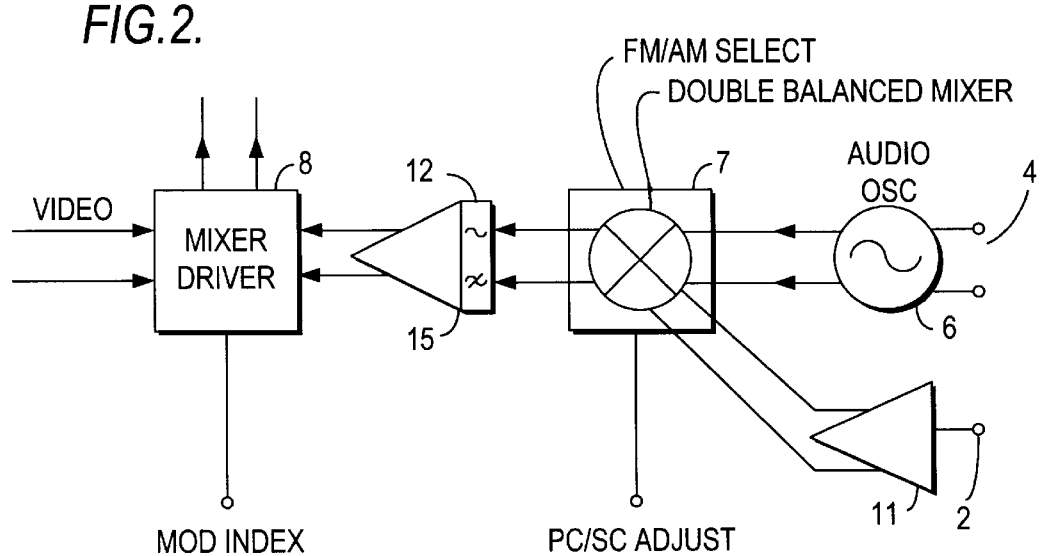
FIG. 2 shows schematically a modulator arrangement in accordance with the present invention.
Figure 3:
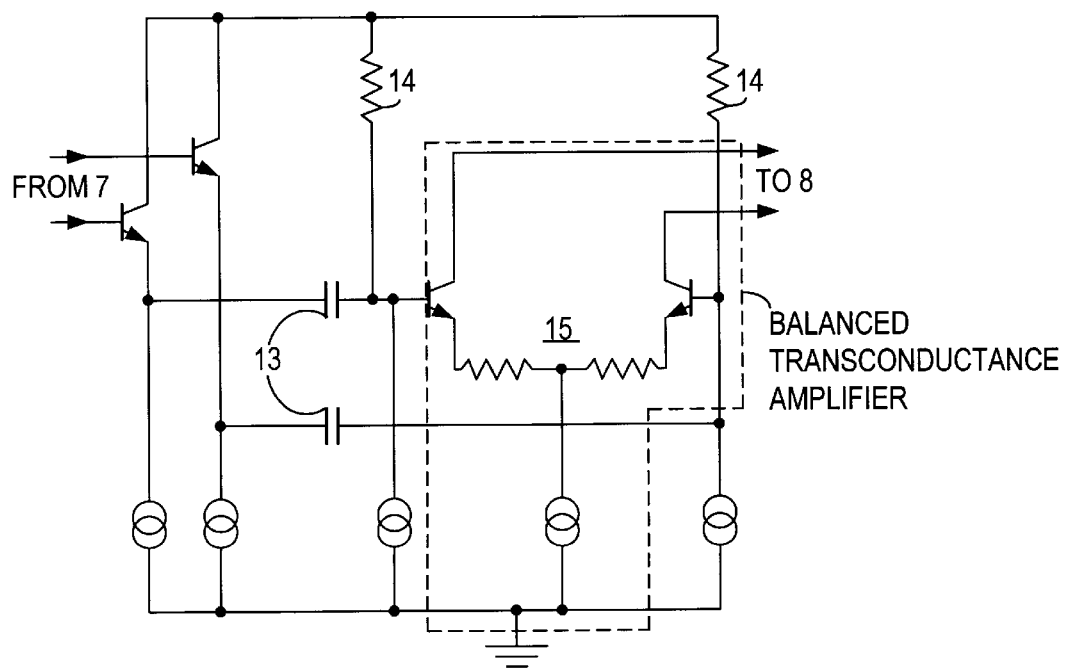
FIG. 3 shows part of the arrangement of FIG. 2 diagrammatically.

Since the sound sub-carrier is at a frequency in the range of 4.5 to 6.5 MHz, while the base-band signals extend only up to, say, 20 KHz, the base-band signals at the output of the circuit 7 can be filtered out by means of a simple high pass filter 12 formed on-chip. As indicated in FIG. 2 and as shown diagrammatically in FIG. 3, this high pass filter 12, comprising series capacitors 13 and shunt resistors 14, is combined with a transconductance stage 15 which feeds the driver circuit 8. The capacitors 13 may have values of 10 pF and the resistors 14 may have values of 5K$\Omega$, giving a base-band attenuation of over 40 dB, and these values can be matched closely, thereby avoiding significant differential effects.

I claim:

1. A video modulator arrangement comprising:

a single-ended to differential amplifier in which audio frequency signals are amplified;

a first modulator circuit in which the amplified audio frequency signals are amplitude-modulated onto a sub-carrier signal;

a combining circuit arrangement in which output signals from said first modulator circuit are combined with video signals;

a second modulator circuit in which signals from said combining circuit arrangement are modulated onto a high frequency carrier signal; and high pass filter means connected between an output of the first modulator circuit and the combining circuit arrangement.

2. The modulator arrangement in accordance with claim 1, wherein the first modulator circuit is arranged to modulate the audio frequency signals onto the sub-carrier signal selectively as amplitude modulation or as frequency modulation.

3. The modulator arrangement in accordance with claim 1, wherein the first modulator circuit comprises a balanced mixer circuit.

4. The modulator arrangement in accordance with claim 2, wherein the first modulator circuit comprises a balanced mixer circuit.

5. The modulator arrangement in accordance with claim 1, wherein the high pass filter means is a first order balanced filter.

6. The modulator arrangement in accordance with claim 2, wherein the high pass filter means is a first order balanced filter.

7. The modulator arrangement in accordance with claim 3, wherein the high pass filter means is a first order balanced filter.

8. The modulator arrangement in accordance with claim 4, wherein the high pass filter means is a first order balanced filter.

9. The modulator arrangement in accordance with claim 5, wherein the filter incorporates a balanced transconductance amplifier interposed between the first modulator circuit and the combining circuit arrangement.

10. The modulator arrangement in accordance with claim 6, wherein the filter incorporates a balanced transconductance amplifier interposed between the first modulator circuit and the combining circuit arrangement.

11. The modulator arrangement in accordance with claim 7, wherein the filter incorporates a balanced transconductance amplifier interposed between the first modulator circuit and the combining circuit arrangement.

12. The modulator arrangement in accordance with claim 8, wherein the filter incorporates a balanced transconductance amplifier interposed between the first modulator circuit and the combining circuit arrangement.

13. The modulator arrangement in accordance with claim 2 implemented as a single-chip multi-standard video modulator.

14. The modulator arrangement in accordance with claim 4 implemented as a single-chip multi-standard video modulator.

15. The modulator arrangement in accordance with claim 6 implemented as a single-chip multi-standard video modulator.

16. The modulator arrangement in accordance with claim 8 implemented as a single-chip multi-standard video modulator.

17. The modulator arrangement in accordance with claim 10 implemented as a single-chip multi-standard video modulator.

18. The modulator arrangement in accordance with claim 12 implemented as a single-chip multi-standard video modulator.

* * * * *